United States Patent [19]
Eguchi et al.

[11] Patent Number: 5,685,611
[45] Date of Patent: Nov. 11, 1997

[54] TOOTHED ROTARY-CAM TYPE RECLINING DEVICE

[75] Inventors: Moriyuki Eguchi, Ebina; Tomonori Yoshida, Yokohama, both of Japan

[73] Assignee: Ikeda Bussan Co., Ltd., Ayase, Japan

[21] Appl. No.: 688,668

[22] Filed: Jul. 29, 1996

[30] Foreign Application Priority Data

Jul. 31, 1995 [JP] Japan ................... 7-243992

[51] Int. Cl.$^6$ ............... B60N 2/20; B60N 2/22
[52] U.S. Cl. ................... 297/367; 297/365
[58] Field of Search ................... 297/363, 365, 297/366, 367, 368

[56] References Cited

U.S. PATENT DOCUMENTS

| | | | |
|---|---|---|---|
| 4,103,970 | 8/1978 | Homier | 297/367 |
| 4,591,207 | 5/1986 | Nithammer et al. | 297/366 |
| 4,770,464 | 9/1988 | Pipon et al. | 297/363 |
| 4,884,845 | 12/1989 | Schmale et al. | 297/367 |
| 4,997,223 | 3/1991 | Croft | 297/367 |
| 5,558,402 | 9/1996 | Yamada | 297/363 |

FOREIGN PATENT DOCUMENTS

| | | |
|---|---|---|
| 55-111460 | 1/1979 | Japan . |
| 6-125821 | 5/1994 | Japan . |

*Primary Examiner*—Peter M. Cuomo
*Assistant Examiner*—Anthony D. Barfield
*Attorney, Agent, or Firm*—Foley & Lardner

[57] ABSTRACT

A reclining device comprises a base fixedly connected to a seat cushion and an arm fixedly connected to a seat back and rotatably supported on the base. The arm has at least one inner toothed portion. A toothed block is slidably disposed between the base and the arm and has an outer toothed portion on an outer periphery thereof and a cam-contour surface on an inner periphery thereof. The base is formed integral with a recessed guide defining therein two parallel diametrically-opposed side walls for slidably guiding the toothed block outward, away from a center of rotation of the arm and inward toward the center of rotation of the arm. A rotary cam has a cam-profile surface on an outer periphery thereof. The cam-profile surface is in cam-connection with the cam-contour surface of the toothed block for producing an outward sliding motion of the toothed block to mesh the outer toothed portion with the inner toothed portion by a rotary motion of the cam in a first rotational direction and for producing an inward sliding motion of the toothed block to unmesh the outer toothed portion from the inner toothed portion by a rotary motion of the cam in a second rotational direction opposing the first rotational direction. An operating lever is mechanically linked to the cam for producing rotary motion of the cam. The two parallel side walls of the recessed guide are formed to guide the toothed block in a direction offset from a direction of a center line of the outer toothed portion of the toothed block by a predetermined angle.

3 Claims, 5 Drawing Sheets

1

TOOTHED ROTARY-CAM TYPE RECLINING DEVICE

BACKGROUND OF THE INVENTION

1. Field of the Invention

The present invention relates to a toothed rotary-cam type reclining device and more particularly to a toothed rotary-cam type seat reclining device which is locked or unlocked by way of a rotary motion of the rotary cam mechanically linked to a reclining lever to ensure an angular adjustment of a seat back.

2. Description of the Prior Art

In recent years, there have been proposed and developed various toothed rotary-cam type reclining devices. One such rotary-cam type reclining device has been disclosed in Japanese Patent Provisional Publication No. 6-125821 (corresponding to French Patent Application No. 91 02590 filed on Mar. 5, 1991). A reclining device disclosed in the Japanese Patent Provisional Publication No. 6-125821 includes a stationary flange portion often called a base fixedly connected to a seat cushion, a rotatable flange portion often called an arm fixedly connected to a seat back, and a rotary cam. The rotatable flange portion is formed with an inner toothed portion on its inner periphery. The stationary flange portion is formed with a plurality of cup-like recessed portions, each radially guiding and slidably accommodating therein a toothed block. A plurality of block pushers are interposed between the rotary cam and the respective toothed blocks. Each toothed block, often called "tooth inner" can be meshed with or unmeshed from the inner toothed portion of the arm by rotation of the rotary cam. In a typical toothed rotary-cam type reclining device, as seen in FIG. 6, a maximum radius of the toothed block, which maximum radius is defined as a distance from the hypothetical center-of-curvature $C_1'$ of the curved or circular-arc shaped outer toothed portion of the toothed block to the tooth tip of the toothed block, is ordinarily designed to be slightly greater than a minimum radius of the inner toothed portion of the arm (or the rotatable flange portion), which minimum radius is defined as a distance from the center $C_2$ of the inner toothed portion of the arm to the tooth tip of the inner toothed portion, so as to produce a slight deviation between a tooth pitch of the inner toothed portion of the arm and a tooth pitch of the outer toothed portion of the toothed block, and thus reducing a possibility of tooth collision between the tooth tips of the meshing pair, and consequently to facilitate the meshed engagement between the arm and the respective toothed blocks. However, in the presence of the slight difference between the previously-noted maximum and minimum radii, as indicated by the two circles indicated by the two-dotted line in FIG. 6, there is a possibility that both tooth tips of a counterclockwise-end tooth and a clockwise-end tooth of the outer toothed portion of each toothed block are simultaneously brought into contact with the inner toothed portion of the arm, because the center line of the outer toothed portion of the toothed block (as may be appreciated from the center line passing through both the hypothetical center-of-curvature $C_1'$ of the curved outer toothed portion of the toothed block and the center $C_2$ of the inner toothed portion of the arm) is identical to a direction of sliding motion of the toothed block. In such an insufficient locked state, also called a half-lock state, as appreciated from the two arrows, a direction of the meshed engagement of the clockwise-end tooth of the toothed block with respect to the inner toothed portion is different from a direction of the meshed engagement of the counterclockwise-end tooth of the toothed block. This disturbs a smooth engagement between the arm and the toothed block. In the half-lock state, assuming that the seat back is excessively loaded, a great torque is transmitted through the inner toothed portion of the arm to each outer toothed portion of the toothed block. This results in undesired tooth wear. To insure a smooth meshed engagement between a rotatable arm and a stationary base, Japanese Utility-Model Provisional Publication No. 55-111460 teaches the provision of a toothed pawl in which the toothed pawl is designed so that a tooth length of the toothed pawl gradually increases from a tooth closest to the pawl pivot shaft to a tooth farthest from the pawl pivot shaft so as to avoid undesired tooth collision between the toothed portion of the pawl and the inner toothed portion of the arm, and consequently to facilitate the meshed engagement of the pawl with respect to the inner toothed portion of the arm. However, it is troublesome to manufacture a toothed pawl formed with teeth whose tooth-lengths are different from each other. Additionally, owing to the different tooth-lengths, there would result in a comparatively less contact-surface area between the meshing pair even under the completely locked condition, thus lowering a mechanical strength of the latched or locked section of the reclining device.

SUMMARY OF THE INVENTION

Accordingly, it is an object of the present invention to provide an improved toothed rotary-cam type reclining device which avoids the foregoing disadvantages of the prior art.

It is another object of the invention to provide a toothed rotary-cam type reclining device which can effectively prevent an undesired half-lock state and ensure a smooth meshed engagement between a rotatable arm and a stationary base by rotation of the rotary cam, irrespective of a standard tooth structure in which geometry and dimensions of teeth formed on a toothed block are identical to each other.

In order to accomplish the aforementioned and other objects of the invention, a reclining device comprises a base fixedly connected to a seat cushion, an arm fixedly connected to a seat back and rotatably supported on the base, the arm having an inner toothed portion, a toothed block slidably disposed between the base and the arm and having an outer toothed portion on an outer periphery thereof and a cam-contour surface on an inner periphery thereof the base being formed integral with a recessed guide defining therein two parallel diametrically-opposed side walls for slidably guiding the toothed block outwardly away from a center of rotation of the arm or inwardly towards the center of rotation of the arm, a rotary cam having a cam-profile surface on an outer periphery thereof, the cam-profile surface being cam-connection with the cam-contour surface of the toothed block for producing an outward sliding motion of the toothed block to mesh the outer toothed portion with the inner toothed portion by a rotary motion of the cam in a first rotational direction and for producing an inward sliding motion of the toothed block to unmesh the outer toothed portion from the inner toothed portion by a rotary motion of the cam in a second rotational direction opposing the first rotational direction, and an operating lever mechanically linked to the cam for producing the rotary motion of the cam, where the two parallel side walls of the recessed guide are formed to guide said toothed block in a direction offset from a direction of a center line of said outer toothed portion of the toothed block by a predetermined angle, the center line being defined as a line passing through both a centre of the outer toothed portion and a hypothetical center-of-curvature of the outer toothed portion. It is preferable that a maximum radius of the outer toothed portion of the toothed block, which maximum radius is defined as a distance from a hypothetical center-of-curvature of the outer toothed portion to a tooth tip of the outer toothed portion, is greater than a minimum radius of the inner toothed portion, which minimum radius is defined as a distance from a hypothetical center-of-curvature of the inner toothed portion to a tooth tip of the inner toothed portion.

DESCRIPTION OF THE PREFERRED EMBODIMENTS

Figure 1:
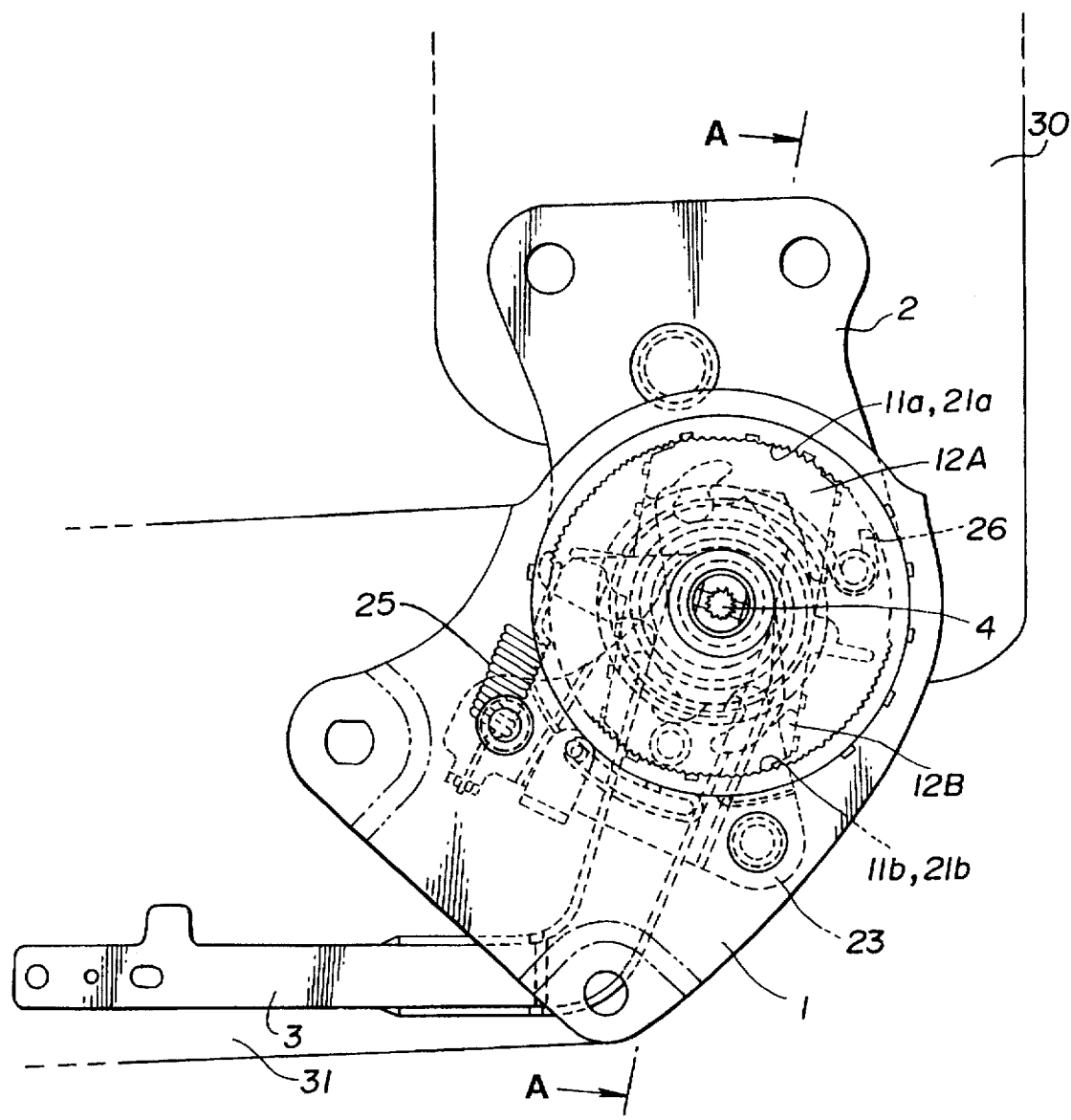
FIG. 1 is an assembled view illustrating one embodiment of a toothed rotary-cam type reclining device made according to the invention.
Figure 2:
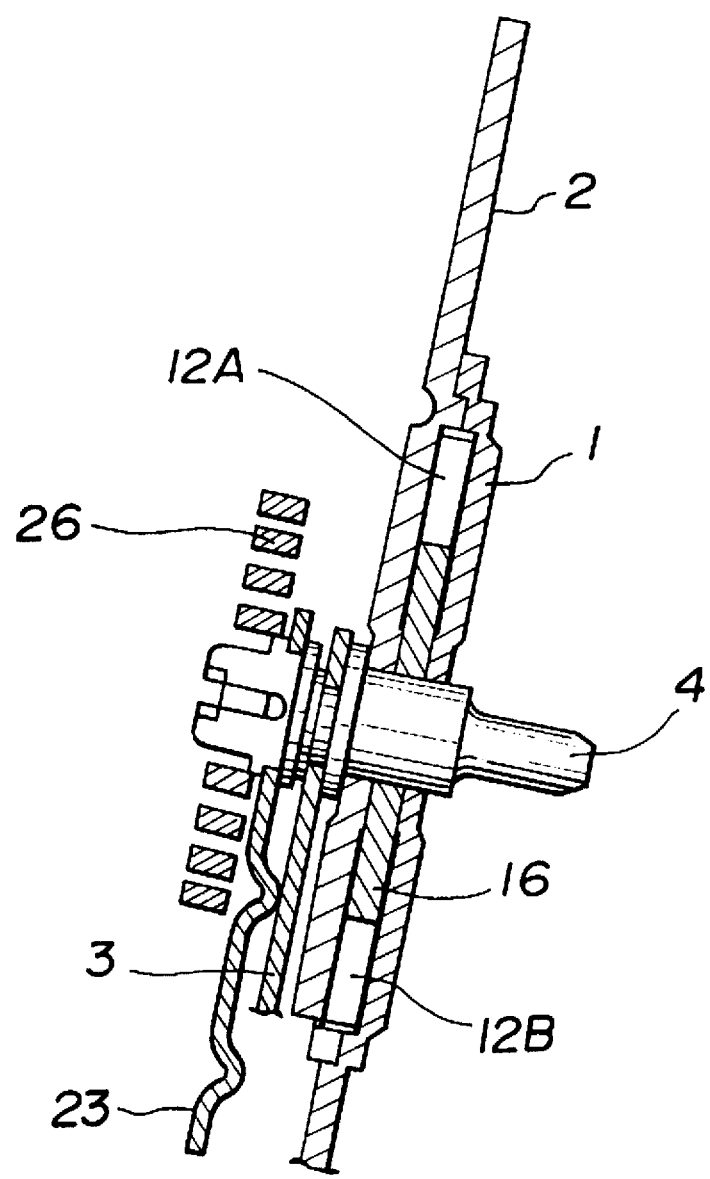
FIG. 2 is a cross-sectional view taken along the line A—A in FIG. 1.
Figure 3:
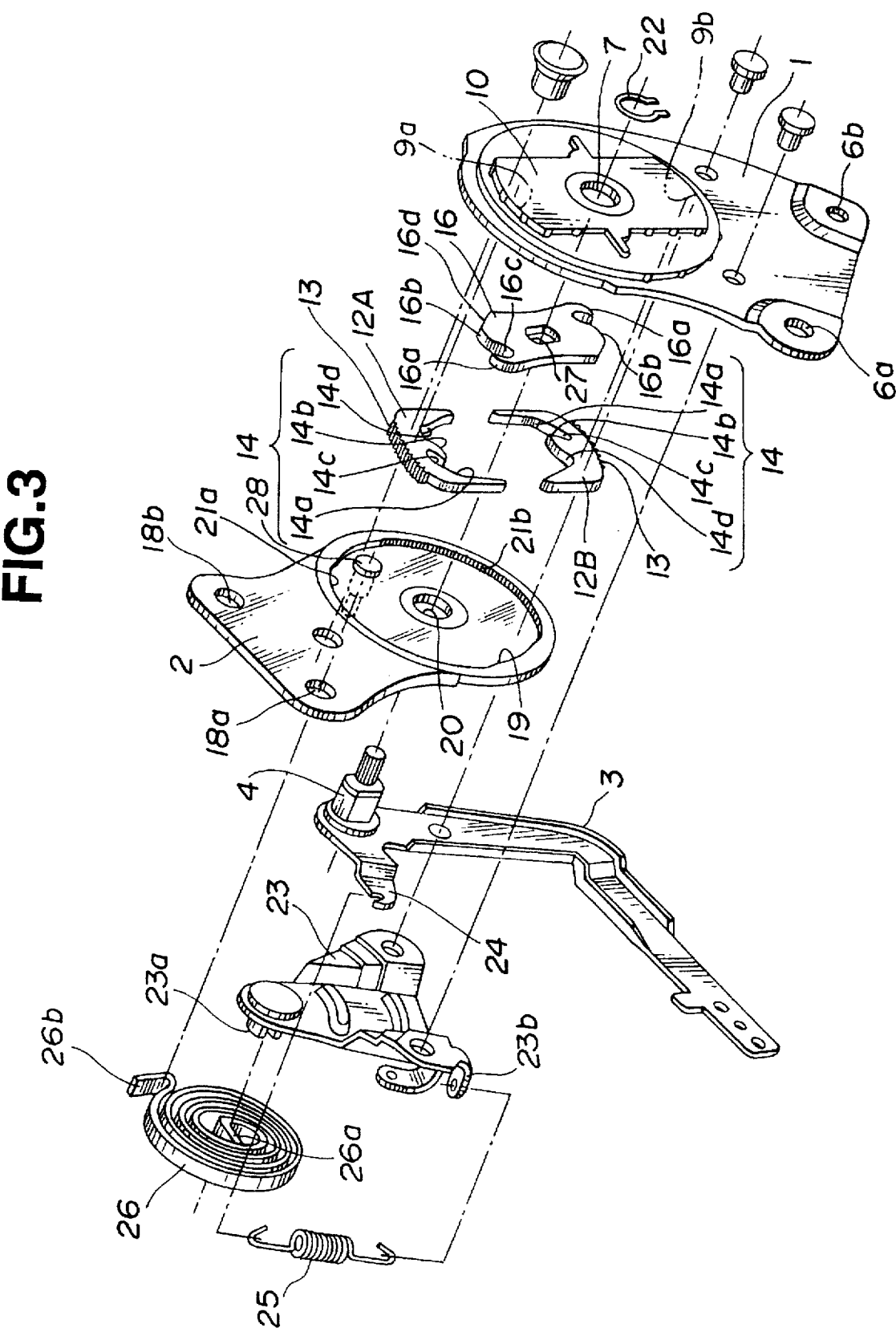
FIG. 3 is a dis-assembled view illustrating the toothed rotary-cam type reclining device of the embodiment.
Figure 4B:
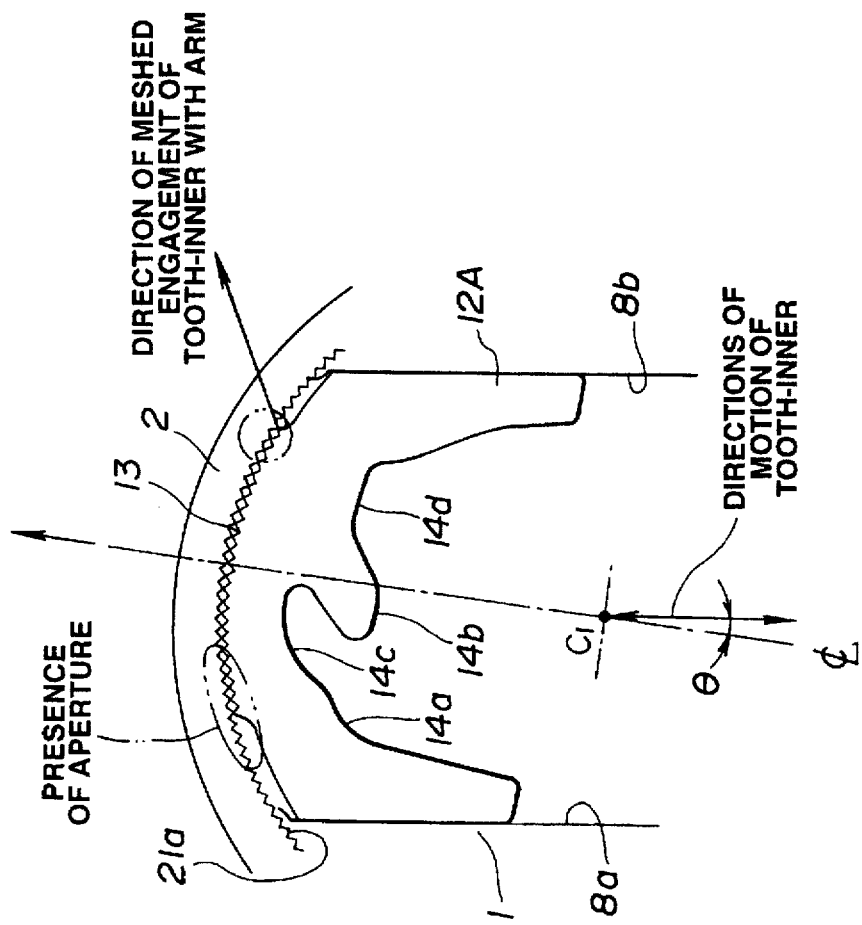
FIG. 4B is an explanatory view illustrating a particular state in which the arm and the toothed block begin to mesh with each other.
Figure 4A:
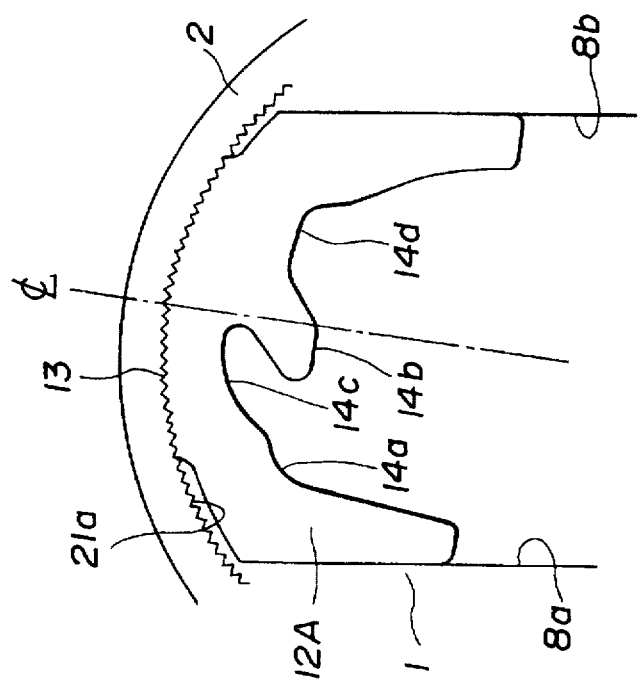
FIG. 4A is an explanatory view illustrating a completely-meshed state between an inner toothed portion of a rotatable arm and an outer toothed portion of a toothed block (a tooth inner).

Referring now to the drawings, particularly to FIGS. 1, 2, 3, 4A and 4B, a toothed rotary-cam type reclining device of the embodiment includes a stationary base 1 fixedly connected to a seat cushion frame 31 through mounting-bolt holes 6a and 6b by means of bolts or the like, a rotatable arm fixedly connected to a seat back 30 through mounting-bolt holes 18a and 18b by means of bolts or the like, a pivot shaft 4 of a reclining lever (or an operating lever) 3 which shaft is rotatably fitted to a central bore 7 of the base 1 through a central bore 20 formed in the arm 2 and a substantially rectangular central bore (not numbered) formed in a rotary cam 16. The pivot shaft 4 is fixedly connected to the reclining lever 3 for rotation together therewith. As seen in FIGS. 3, 4A and 4B, the base 1 is formed with a substantially rectangular recessed portion 10. The recessed portion 10 has a substantially rectangular vertically-extending flat wall (not numbered) with the central bore 7, a pair of diametrically-opposing elongated side walls 8a and 8b, an upper circular-arc shaped side wall 9a being continuous with upper ends of the side walls 8a and 8b, and a lower circular-arc shaped side wall 9b being continuous with lower ends of the side walls 8a and 8b. As will be described later, since the side walls 8a and 8b function to guide a pair of slidable toothed blocks 12A and 12B, the recessed portion 10 will be hereinafter referred to as a "tooth-inner guide". As seen in FIG. 3, the pivot shaft 4 has a pair of diametrically opposing circular-arc faces and a pair of rectangular flat faces. Each circular-arc face serves as a sliding surface which is slidably fitted to the inner peripheral surface of the central bore 20 of the arm 2. For co-rotation with the pivot shaft 4 of the operating lever, the substantially rectangular bore 27 of the rotary cam 16 is contoured in a manner as to be precisely fitted onto the pivot shaft 4 without any play. After the pivot shaft 4 is fitted into the bore 7 of the base 1 while supporting thereon both the arm 2 and the rotary cam 16, a snap ring 22 is fitted on the free end of the pivot shaft 4 to prevent the axial movement of the pivot shaft with respect to the base 1. The arm 2 is formed integral with a ring-gear like portion 19 having a pair of diametrically-opposing circular-arc shaped inner toothed portions 21a and 21b, which are point-symmetrical with respect to the axis of the pivot shaft 4. When assembling, a pair of toothed blocks (12A, 12B) are accommodated in an internal space defined between the ring-gear like portion 19 of the arm 2 and a substantially rectangular recessed tooth-inner guide 10, so that the outer toothed portion 13 of each toothed block (12A; 12B) is meshable with the associated inner toothed portion (21a; 21b) of the arm 2, and so that the rotary cam 16 is accommodated between the toothed blocks (12A; 12B). The toothed block is often called "tooth inner". The pair of toothed blocks 12A and 12B are point-symmetrical with respect to the axis of the pivot 4. More precisely, a pair of diametrically-opposing curved inner toothed portions 11a and 11b are formed on the respective curved side walls 9a and 9b of the tooth-inner guide 10. The inner diameter of the ring-gear like portion 19 is identical to the inner diameter of the diametrically-opposing curved side walls 9a and 9b. The outer toothed portion 13 of the upper toothed block 12A are meshable with or unmeshable from both the inner toothed portion 21a of the arm and the inner toothed portion 11a of the base to insure an increased mechanical strength of the reclining device kept in its completely locked state. The operating lever (or the reclining lever) is formed with an armed portion 24 having a spring slot at which one hooked end of a return spring 25 for example a coiled tension spring is hanged. The other hooked end of the spring 25 is hanged at a bracket 23b of a holder 23 which is fixedly connected to the base 1 by means of rivets. Thus, the operating lever is biased to its initial position (a spring-loaded position) by way of the bias of the spring 25. The holder 23 is formed integral with a slotted shaft 23a. The slotted portion of the slotted shaft 23a is engaged with the innermost central end 26a of a return spring 26 for example a spiral spring. The outermost curled end 26b of the return spring 26 is engaged with a pin 28 fixed to the arm 2. Thus, the seat back fixedly connected to the arm 2 is permanently forced to tilt forwards. Each toothed block (12A; 12B) is formed with a cam-contour surface 14 on its inner periphery, in addition to the outer toothed portion 13. On the other hand, the rotary cam 16 is formed with a pair of diametrically-opposing cam-profile surfaces on its outer periphery. As best seen in FIGS. 4A and 4B, the cam-contour surface 14 of each toothed block (12A; 12B) comprises first and second projected portions 14a and 14b, and first and second groove-cut portions 14c and 14d being continuous with the respective projected portions 14a and 14b. As best seen in FIG. 3, each cam-profile surface of the rotary cam 16 comprises a first finger-tip like cam portion 16a, a second slightly-undulated cam portion 16b, a groove-cut portion 16c defined between the first and second cam portions 16a and 16b, and a substantially-straight sloped cut-out portion 16d being continuous with the second cam portion 16b. The rotary cam 16 is so designed that a first cam set consisting of the first and second cam portions (16a, 16b) and a second cam set consisting of the first and second cam portions (16a, 16b) are point-symmetrical with respect to the axis of the pivot shaft 4 or the center axis of the cam 16. The first cam portion 16a is in cam-connection with the cam contour defined by the first projected portion 14a and the first groove-cut portion 14c, whereas the second cam portion 16b is in cam-connection with the cam contour defined by the second projected portion 14b and the second groove-cut portion 14d. The toothed rotary-cam type reclining device of the embodiment operates as follows.

Figure 5:
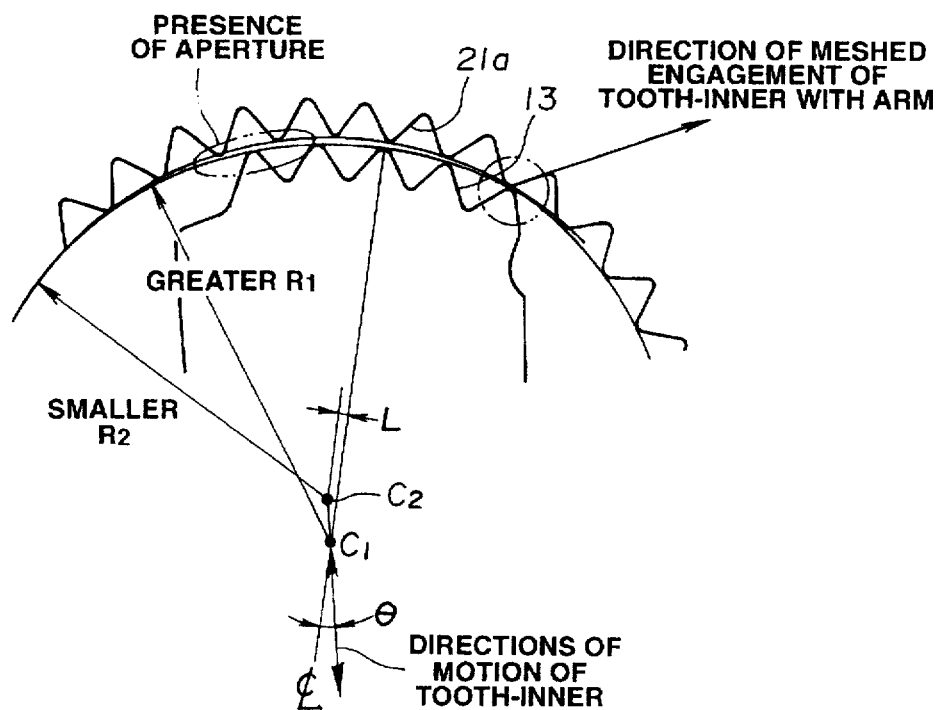
FIG. 5 partly enlarged view used to explain the details of the meshing process between the toothed block and the arm, related to FIG 4B.
Figure 6:
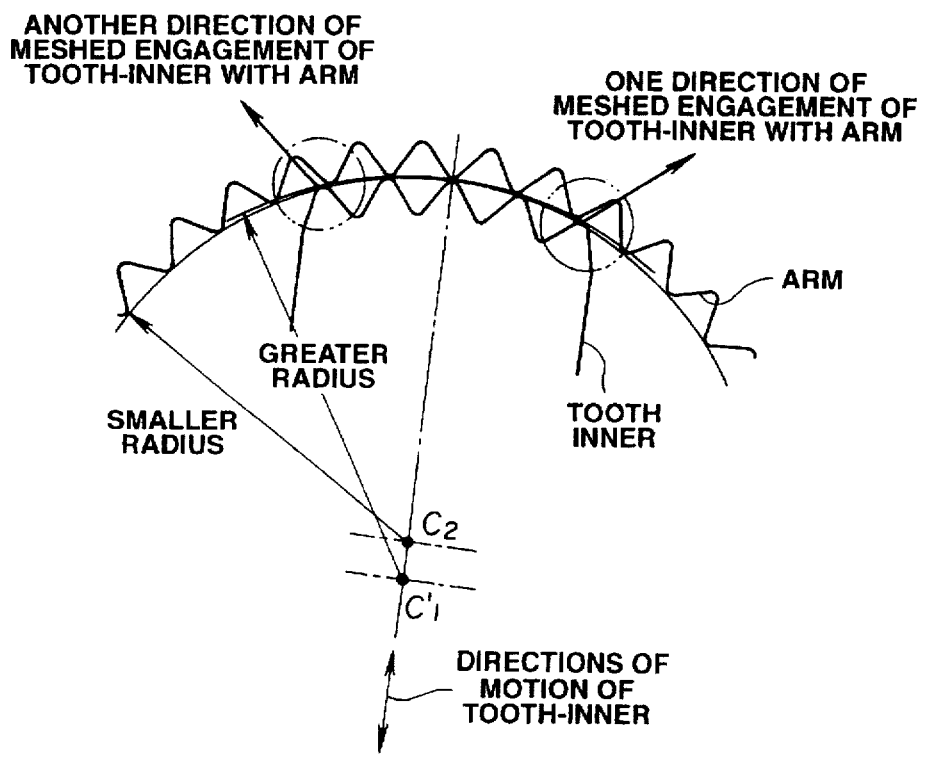
FIG. 6 is a partly enlarged view showing a half-lock state of a prior art reclining device.

Returning again to FIG. 1, the reclining lever 3 is normally biased to its initial position (or the spring-loaded position) in the anti-clockwise direction (viewing FIG. 1) by way of the bias of the spring 25, and engaged with the holder 23 and thus the maximum anti-clockwise rotational movement of the lever is restricted. Under such a released condition of the reclining lever, the first and second cam portions 16a and 16b of each cam-profile surface of the rotary cam 16 are firmly engaged with the respective first and second projected portions 14a and 14b of each cam-contour surface 14 of each toothed block (12A; 12B) by counterclockwise rotation of the pivot shaft 4 fixed to the lever 3. Thus, the toothed blocks (12A; 12B) become moved outward by counterclockwise rotation of the cam, while being guided by the two parallel side walls 8a and 8b of the recessed tooth-inner guide 10. As a consequence, as seen in FIG. 4A, the outer toothed portions 13 of the toothed-block pair (12A; 12B) are brought into meshed-engagement with the respective inner toothed portions 21a and 21b of the arm 2, and also with the respective inner toothed portions 11a and 11b of the base 1. As appreciated, with the reclining lever 3 held in its initial position, the reclining device is held in a completely locked state in which the relative o rotational-motion of the arm 2 to the base 1 is prevented by meshed-engagement between the toothed-block pair 12A and 12B and the arm 2. When the seat back is loaded in the previously-noted completely-locked state, torque is transmitted through the arm 2 to the toothed-block pair (12A; 12B). The base 1 has a mechanical strength and rigidity enough to receive the transmitted torque through the pair of side walls 8a and 8b of the tooth-inner guide. The completely-locked state is maintained by the bias of the spring 25 and the abutment between the side walls (8a; 8b) and side walls of the toothed-block pair (12A; 12B). For the purpose of shifting from the previously-noted completely-locked state to an unlocked state, the lever 3 is pulled up and rotated clockwise (viewing FIG. 1) against the spring bias, and thus the rotary cam 16 also rotates clockwise. The clockwise rotation of the cam 16 causes the first and second cam portions 16a and 16b of each cam-profile surface of the cam 16 to be disengaged from the respective first and second projected portions 14a and 14b of each cam-contour surface of the toothed-block pair (12A; 12B). Then, the arm 2 becomes rotated anti-clockwise, since the arm 2 is permanently forced anti-clockwise by way of the return spring 26. In conjunction with the clockwise motion of the cam, such a rotational motion of the arm 2 produces an inward sliding motion or a contracted motion of the toothed-block pair (12A; 12B). In this manner, the outer toothed portions 13 and 13 of the toothed-block pair (12A; 12B) are unmeshed from the inner toothed portions 21a and 21b of the arm and from the inner toothed portions 11a and 11b of the base 1 by way of the clockwise rotation of the lever 3. Under these conditions, the seat back can be adjusted towards a desired angular position. When the lever 3 is returned to the initial position with the seat back adjusted at the desired angular position, the rotary cam 16 rotates counterclockwise together with the lever, with the result that the toothed blocks 12A and 12B become slid outwards, and thus the outer toothed portions 13 and 13 of the toothed blocks 12A and 12B are brought again into meshed-engagement with the inner toothed portions 21a and 21b of the arm and with the inner toothed portions 11a and 11b of the base. In this manner, the angular adjustment of the seat back can be attained. FIGS. 4B and 5 show a particular condition in which the arm 2 and the toothed-block pair (12A; 12B) begin to mesh with each other. Note that for the sake of illustrative simplicity, only one of the two meshing pairs of teeth is shown in FIGS. 4A, 4B and 5.

Referring now to FIGS. 4B and 5, the center line of the outer toothed portion 13 of the upper toothed block 12A, which center line is defined as a line passing through both the centre of the curved outer toothed portion 13 and a hypothetical center-of-curvature $C_1$ of the outer toothed portion 13, is not equal to a direction of sliding motion of the toothed block. In the shown embodiment, a direction of the center line of the outer toothed portion 13 of each toothed block is offset from the direction of sliding motion of the toothed block by a predetermined angle θ such as 5 degrees in the clockwise direction (viewing FIGS. 4B and 5). As best seen in FIG. 5, owing to the previously-noted angular offset θ, a hypothetical center-of-curvature $C_2$ of the inner toothed portion 21a of a relatively smaller radius $R_2$ is slightly offset from the hypothetical center-of-curvature $C_1$ of the outer toothed portion 13 of a relatively greater radius $R_1$ by an offset distance L with respect to the direction of the center line of the outer toothed portion 13 of each toothed block. The hypothetical center-of-curvature $C_2$ of the inner toothed portion is actually equivalent to the centre of rotation of the arm 2 or to the centre of the pivot shaft 4. As a result of this, as appreciated from the circle indicated by the two-dotted line in FIGS. 4B and 5, the rightmost-end tooth or the clockwise-end tooth of the outer toothed portion 13 abuts face-to-face with a certain tooth of the inner toothed portion 21a of the arm and the rightmost-end tooth begins to mesh with the inner toothed portion 21a along the tooth profile in the direction as indicated by the arrow. On the other hand, the leftmost-end tooth or the counterclockwise-end tooth of the outer toothed portion 13 is not yet brought into meshed-engagement with the inner toothed portion, since the previously-noted offset produces a slight aperture between the leftmost-end tooth and the inner toothed portion, as seen in the ellipse indicated by the two-dotted line in FIGS. 4B and 5. The slight difference between the radii $R_1$ and $R_2$ ensures the aperture defined between the outer toothed portion 13 and the inner toothed portion 21a, resulting from the angular offset θ, at the beginning of the meshed engagement. Also, at the beginning of meshed-engagement, since only the rightmost-end tooth of the outer toothed portion 13 meshes with the inner toothed portion 21a, the outward sliding motion of the toothed block 12A results in the relative rotational-motion of the ring-gear like portion 19 of the arm 2 along the tooth profile of the rightmost-end tooth of the toothed block 12A. In the shown embodiment, since the left-hand side meshing surface of the rightmost-end tooth begins to mesh with the inner toothed portion 21a, the arm 2 rotates slightly in the counterclockwise direction with respect to the base 1. From the beginning to the end of meshed engagement, the engagement tends to gradually develop from the rightmost-end tooth to the leftmost-end tooth. Thus, the reclining device of the embodiment can be smoothly shifted from the unmeshed state to the completely-meshed state without experiencing any half-lock state, during the meshing operation. The angular offset θ will be hereinafter referred to as a "half-lock prevention angle θ". In the embodiment, although the half-lock prevention angle θ is provided so that a direction of the center line of the outer toothed portion 13 of each toothed block is offset from the direction of sliding motion of the toothed block by a predetermined angle θ for example 5° in the clockwise direction. To provide the same effect as the embodiment, the half-lock prevention angle θ may be provided so that a direction of the center line of the outer toothed portion of each toothed block is offset from the direction of sliding motion of the toothed block by a predetermined angle θ for example 5° in the anti-clockwise direction.

Although the reclining device of the embodiment is exemplified in case of a diametrically-opposing two toothed blocks (12A; 12B) in cam-connection with a rotary cam, the device according to the invention may be applied to a rotary-cam type reclining device with three or more toothed blocks provided between a rotary cam and an inner toothed portion of a rotatable arm, as disclosed in the Japanese Patent Provisional Publication No. 6-125821 (corresponding to French Patent Application No. 91 02590 filed on Mar. 5, 1991).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A reclining device comprising:

a base fixedly connected to a seat cushion;

an arm fixedly connected to a seat back and rotatably supported on said base, said arm having at least one inner toothed portion;

a toothed block slidably disposed between said base and said arm and having an outer toothed portion on an outer periphery thereof and a cam-contour surface on an inner periphery thereof;

said base being formed integral with a recessed guide defining therein two parallel diametrically-opposed side walls for slidably guiding said toothed block outward away from a center of rotation of said arm and inward toward the center of rotation of said arm;

a rotary cam having a cam-profile surface on an outer periphery thereof, said cam-profile surface being in cam-connection with said cam-contour surface of said toothed block for producing an outward sliding motion of said toothed block to mesh said outer toothed portion with said inner toothed portion by a rotary motion of said cam in a first rotational direction and for producing an inward sliding motion of said toothed block to unmesh said outer toothed portion from said inner toothed portion by a rotary motion of said cam in a second rotational direction opposing said first rotational direction; and an operating lever mechanically linked to said cam for producing said rotary motion of said cam;

wherein said two parallel side walls of said recessed guide are formed to guide said toothed block in a direction offset from a direction of a center line of said outer toothed portion of said toothed block by a predetermined angle, said center line being defined as a line passing through both a center of said outer toothed portion and a hypothetical center-of-curvature of said outer toothed portion; and wherein a maximum radius of said outer toothed portion of said toothed block, which maximum radius is defined as a distance from said hypothetical center-of-curvature to a tooth tip of said outer toothed portion, is greater than a minimum radius of said inner toothed portion, which minimum radius is defined as a distance from a hypothetical center-of-curvature of said inner toothed portion to a tooth tip of said inner toothed portion.

2. A reclining device, comprising:

a base fixedly connected to a seat cushion;

an arm fixedly connected to a seat back and rotatably supported on said base, said arm having a pair of diametrically-opposed inner toothed portions;

a pair of toothed blocks slidably disposed between said base and said arm and having a same geometry and dimensions, each of said toothed blocks having an outer toothed portion on an outer periphery thereof and a cam-contour surface on an inner periphery thereof;

said base being formed integral with a recessed guide defining therein two parallel diametrically-opposed side walls for slidably guiding said toothed blocks outwardly away from a center of rotation of said arm and inwardly towards the center of rotation of said arm;

a rotary cam having a pair of diametrically-opposed cam-profile surfaces on an outer periphery thereof, each of said cam-profile surfaces being in cam-connection with an associated one of said cam-contour surfaces of said toothed blocks for producing an outward sliding motion of each toothed block to mesh said outer toothed portion with said inner toothed portion by a rotary motion of said cam in a first rotational direction and for producing an inward sliding motion of each toothed block to unmesh said outer toothed portion (13) from said inner toothed portion by a rotary motion of said cam in a second rotational direction opposing said first rotational direction, said diametrically-opposed cam-profile surfaces being point-symmetrical with respect to a central axis of said cam; and an operating lever mechanically linked to said cam for producing said rotary motion of said cam;

wherein said recessed guide is formed at said base so that a direction of a center line of said outer toothed portion (13) of each toothed block is offset from a direction of sliding motion of said toothed block by a predetermined angle said center line being defined as a line passing through both a centre of said outer toothed portion and a hypothetical center-of-curvature of said outer toothed portion.

3. A reclining device as claimed in claim 2, wherein a maximum radius of said outer toothed portion of each toothed block, which maximum radius is defined as a distance from said hypothetical center-of-curvature to a tooth tip of said outer toothed portion, is greater than a minimum radius of each inner toothed portion, which minimum radius is defined as a distance from a hypothetical center-of-curvature of the inner toothed portion to a tooth tip of the inner toothed portion.

\* \* \* \* \*